Nov. 15, 1949 — C. E. BRIDWELL — 2,488,075
VALVE CAGE
Filed Sept. 2, 1944 — 2 Sheets-Sheet 1
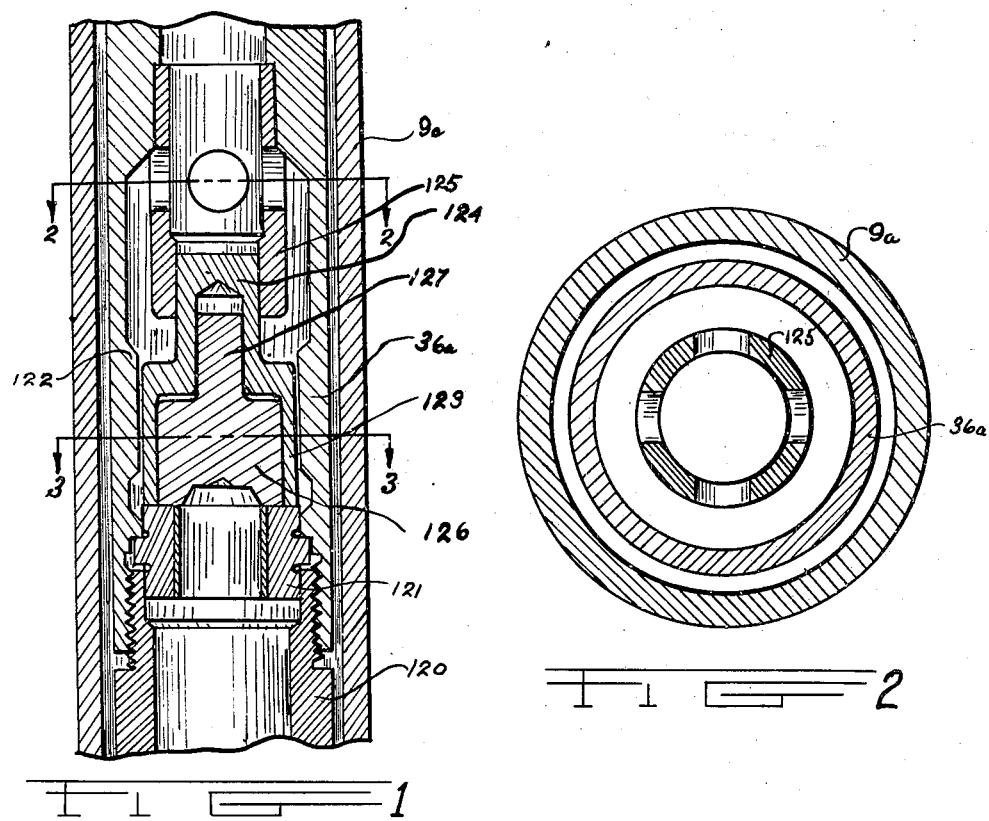
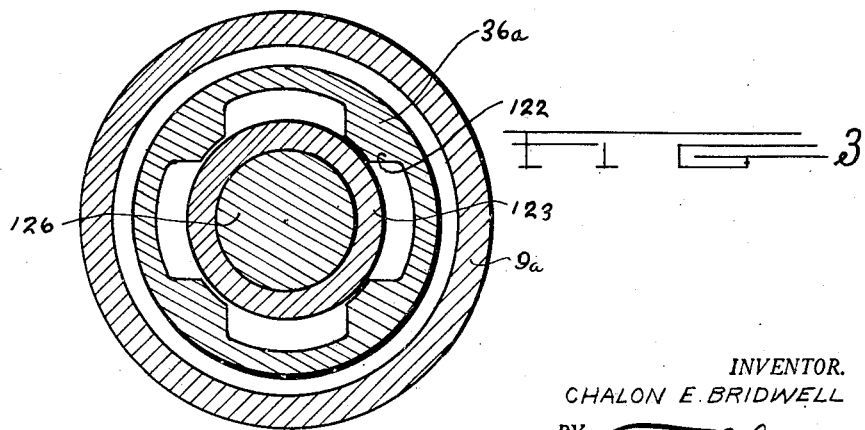
INVENTOR.
CHALON E. BRIDWELL
BY
HIS ATTORNEY

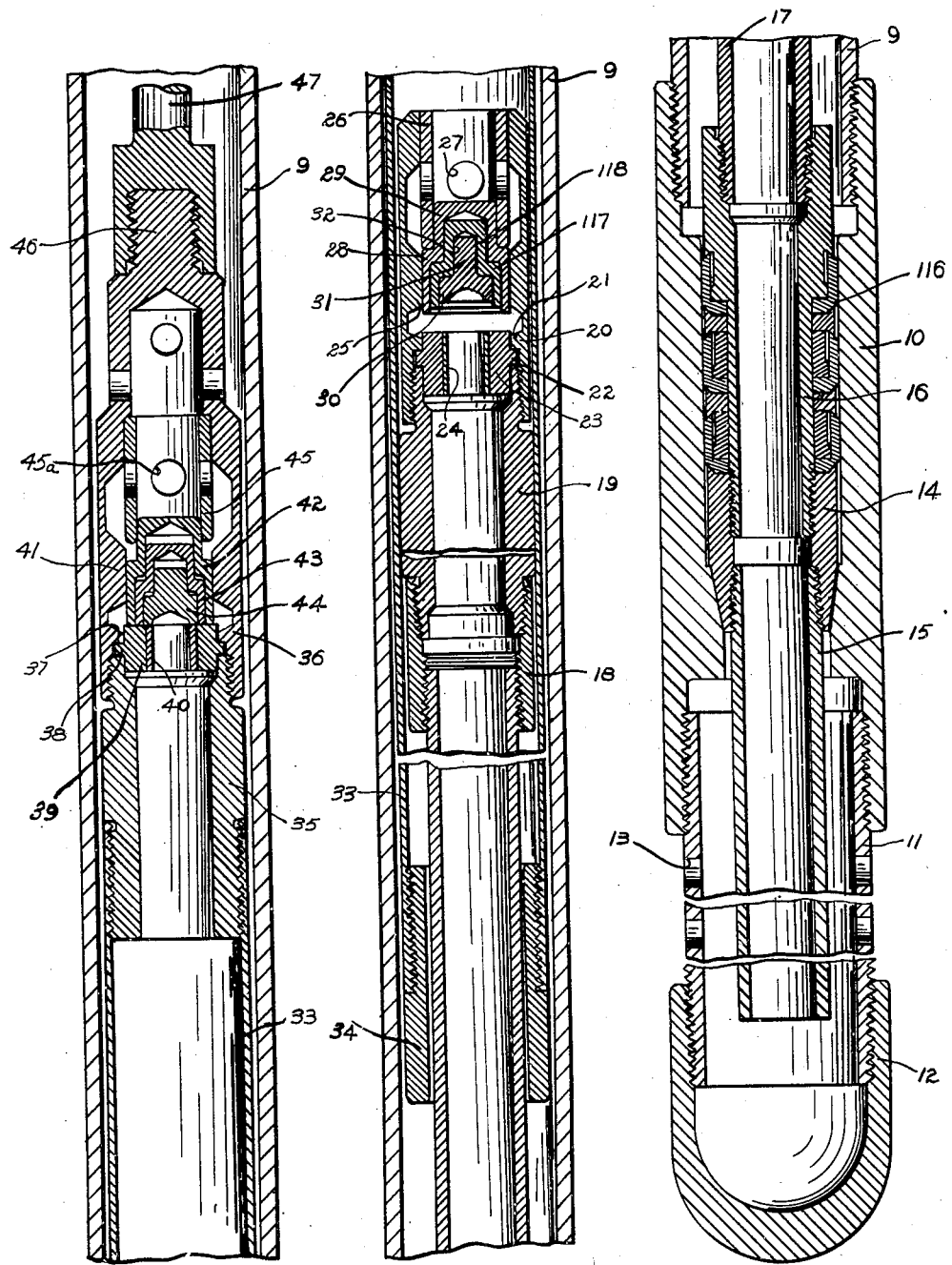

Patented Nov. 15, 1949

2,488,075

UNITED STATES PATENT OFFICE 2,488,075

VALVE CAGE

Chalon E. Bridwell, Detroit, Mich.

Application September 2, 1944, Serial No. 552,532

2 Claims. (Cl. 277—70)

My invention relates to a new and useful improvement in a pumping mechanism, particularly adapted for pumping from deep wells, such as oil wells and the like. In such pumping mechanisms, there is commonly used a standing valve which is generally positioned at the lower end of the pump and a travelling valve which travels either with the pump barrel or the pump plunger. These valves are so arranged that they will seat themselves by gravity and by the force of the liquid column above on a suitable valve seat. The valve seat is mounted on a structure known as the valve cage and the valve member, whether it be a ball or a disc or a valve member such as is set out in this application, is enclosed in the cage. In the present invention, I have provided a valve structure in which members loosely positioned in the valve cage are adapted to engage the valve seat and form the valve. The structure is such that a plurality of these members will engage the same valve seat and effectuate the desired sealing.

It is an object of the present invention to provide in a valve cage a means for guiding the valve members so that the valve members are engaged and guided at separated points.

It is another object of the invention to provide a valve cage and valve mechanism so arranged that the wobbling or shifting of the valve members is reduced to a minimum, the valve cage thus cooperating with the valve member to assure accuracy in seating.

Another object of the invention is the provision of a valve cage so arranged and constructed that the specific form of valve member illustrated herein may be used, as well as other standard types of valve members, such as balls, discs and the like. Thus, the present valve cage may be utilized for a special valve, such as is set out herein, or with standard valves now commonly in use.

Other objects will appear hereinafter.

It is recognized that various changes and modifications may be made in the detail of structure illustrated without departing from the invention itself and it is intended that such modifications and changes shall be encompassed within the claims which form a part hereof.

Forming a part of this specification are drawings in which,

Fig. 1 is a slightly enlarged, fragmentary, central, sectional view of the invention;

Fig. 2 is a sectional view taken on line 2—2 of Fig. 1;

Fig. 3 is a sectional view taken on line 3—3 of Fig. 1;

Fig. 4 is a central, vertical, sectional view of the invention showing it applied and illustrating the travelling valve;

Fig. 5 is a central, vertical, sectional view showing the invention applied, taken at a point below Fig. 4 and showing the standing or central valve;

Fig. 6 is a central, vertical, sectional view of the lower end of the well structure taken below the position of Fig. 5.

In the drawings, I have illustrated the invention used in an oil well having a tubing 9 to the lower end of which is secured one end of an anchor shoe 10, the other end of which is secured to the upper end of the gas separator tube 11, which is closed at its lower end by the bull plug 12. The seating collar 14 is adapted to seat against the inner face of the anchor shoe 10 and secured to and projecting downwardly from this seating collar 14 is a production tube 15, openings 13 being formed in the tube 11. The seating collar 14 is secured to the lower end of the cup and anchor hold down tube 16 which carries the sealing cups 116. Secured to the upper end of the hold down tube 16 is the lower end of the pull tube 17, the upper end of which is connected to the coupling 18. This coupling 18 is connected at its upper end to the lower end of the plunger 19. The upper end of the plunger 19 is connected to the lower end of the valve cage 20. This valve cage has an inwardly projecting flange 21 against which is pressed the peripheral flange 22 of the valve seat 23 through which is formed a bore or passage 24 lined with a suitable bushing. Projecting inwardly from the valve cage 20 above the valve seat 23 are longitudinally directed, circumferentially spaced ribs 25 which serve as guides for the valve members. Pressed inwardly in the upper end of the valve cage 20 and projecting inwardly thereof is a tube 26 having the openings 27 formed therein. This tube serves as a guide for a valve member 28 which is formed cup-shaped and adapted to engage at the end faces of its open end with the valve seat 23. This cup-shaped valve member 28 is provided with the hollow neck 29 which slidably engages in the tube 26. Nesting in the valve 28 is a cup-shaped valve 117 having the hollow neck 118 which slidably engages in the hollow neck 29. Nesting in the cup-shaped valve 117 is the cup-shaped valve 30 which is adapted to engage at the end faces of its open end with the valve seat 23. This valve 30 is provided with the stem 31 which slidably engages in the bore 32 in the hollow neck 118. It will be noted that the tube 26 serves as a guide for the valve member 28. The ribs 25 also serve as guide members for this valve. The outer valve serves as a guide member for the next inwardly positioned valve, these valves being arranged concentrically. The tube 26 also serves as a guide for the outer valve 28 so that the valve is thus guided at two separate points.

Embracing this standing valve structure is the barrel pump 33 to the lower end of which is secured the fitting 34 which serves to engage the lower face of the coupling 18 when it is desired to pull the pump. The upper end of the barrel 33 is secured to the connector 35 which connects at its upper end to the lower end of the valve cage 36. Projecting inwardly from the inner surface of the valve cage 36 is the circular flange 37 against which is clamped the peripheral flange 38 on the valve seat 39 which has a bore formed therethrough lined by a suitable bushing 40. Projecting inwardly from the inner surface of the cage 36 and circumferentially spaced apart are the longitudinally directed guide ribs 41 which serve to engage and guide the cup-shaped valve 42. This valve is cup-shaped and serves to engage at the end faces of its open end with the valve seat 39. Nested in the valve 42 is a cup-shaped valve 43 which also serves to engage the end face of the valve seat 39. Nested in the cup-shaped valve 43 is the cup-shaped valve 44 which serves to engage at the end faces of its open end with the valve seat 39. Each of these cup-shaped valves is provided with a neck, the neck on the valve 44 projecting into the hollow neck on the valve 43 and the neck of the valve 43 projecting into the hollow neck of the outer valve 42, all in slidable relation. The neck on the outer valve 42 engages as a slip fit in the guide tube 45, which is fixedly mounted on the cage 36 and which is provided with the openings 45a. The upper end of the valve cage is provided with the studded portion 46 to which is connected the sucker rod 47.

The construction is such that when the barrel 33 is moving upwardly, the valves 42, 43 and 44 will be moved into closing position, as shown in Fig. 4. It will be noted that the outer valve 42 is still projected in the guide tube 45 and that the guide ribs 41 are serving as guides for the valve 42. The standing valve members 117, 28 and 30 are in open position, as shown in Fig. 5, and in this position, the guide tube 26 is functioning in the manner similar to the guide tube 45, and the guide ribs 25 are functioning in a manner similar to the guide ribs 41. As shown in Fig. 3, these guide ribs are spaced apart to provide the necessary space for passage of liquid through the tube.

In the enlarged form shown in Fig. 1, I have indicated the tube 9a embracing the valve cage 36a, this valve cage being connected to the tubular part 120, which is positioned therebelow and which serves to retain the valve seat 121 in position. The guide ribs 122 serve as guides for the cup-shaped valve 123 having the hollow neck 124 which enters the guide tube 125. Nesting in the cup-shaped valve 123 is the cup-shaped valve 126 having the stem 127 engaging in the hollow neck 124. This structure is illustrated to indicate that a pair of valves may be used instead of three, as shown in Fig. 4.

The construction is such that the valve members illustrated may be used. The construction is such also that these valve members may be removed and replaced with the standard, well-known valve drop, such as a ball or a disc. Consequently, in addition to the double guiding of the valves in their movement, I have provided a standardized valve cage which may be used on conventional valve drops. The particular structure permitting the flow of the liquid around the cup-shaped valves and upwardly through the openings indicated is such that a minimum amount of metal is used in the construction of the valve mountings and the valve cage. In other words, the over-all length is reduced to a minimum because of the particular type of construction, thus reducing the weight and, of course, the cost of manufacture.

Between the ribs 41 and the valve 42 and between the neck of the valve 42 and the guide tube 45, there is sufficient clearance so that a relative movement of the valve 42 radially to the ribs 45 may be effected. Should sand or other material lodge under one side of the valve 42 so as to retain it spaced from its seat, this would cause a tilting of the valve 42 and there must be sufficient clearance between the ribs 41 and the tube 45 and the adjacent portion of the valve 42. Likewise, there must be sufficient clearance between the valve 43 and the valve 42, and the valve 44 and the valve 43 so as to permit either to tilt relatively to the other should a small particle of foreign material prevent one side of any of these valves from properly seating. The same would apply to the valve 28, the guide ribs 25 and the tube 26. The same would likewise apply to the valves 117 and 30.

Actually, in practice, where sand or foreign material is present in the oil or liquid, neither of the cup-shaped valves will effect a close leak-proof seal with the face of the seat. These particles of foreign material lying on the face of the valve seat will not be squeezed out of the way or off the valve seat when the valves come down to seat but they will be crushed until they constitute but a very, very fine layer. This layer, however, will not be necessarily uniform throughout the circumference of the valve seat face so that there will always be some leakage or back flow between the valve seat face and the meeting face of the valve. This is true also where the foreign material accumulates excessively at one point so as to raise the valve slightly off its seat and cause the tilting referred to.

There is a function and operation of the valve which is important when this feature is considered. Below the upper face of the valve seat is the low pressure side and above this face is the high pressure side. Because there is sufficient clearance between the nested valves to permit liquid to flow therein, the back flowing liquid will be slowed up or retarded in its movement. For instance, in Fig. 1, the valve 123, even when raised slightly from its seat, will retard the back flow of oil passing under it. This oil passing under it will further be slowed up because the oil may rise in the cup-shaped member 123 to fill the vacant space therein. Again, the valve 126, even though raised slightly from its seat at some point will serve as an obstruction to prevent the back flow. The result is that even though the oil is of a very sandy nature, the cutting action of the back flow will be avoided because the velocity of the oil flowing backward is cut down to such an extent that the cutting of the sand cannot take effect.

I claim:

1. In a construction of the class described: a valve cage adapted for mounting in vertical position; a valve seat mounted on the lower end of said cage and having a central opening formed therethrough for passage of liquid therethrough and provided on its upper end with a valve engaging face; a plurality of concentrically arranged cup-shaped valves arranged in nesting relation and simultaneously engaging at the end faces of their open ends with said valve engaging face and independently movable relatively to said valve seat, each of said valves being reduced in internal diameter inwardly from the open end thereof to provide an internal and a peripheral shoulder, the depth of the reduced portion of the valve in which another valve is nested being greater than the length of the reduced portion of the nested valve to provide a space between the inner face of the base of one valve and the outer face of the base of the nested valve upon engagement of the opposed shoulders on said valve, said valves nesting with clearance between the same for permitting entry of liquid thereinto, the internal shoulder of the outer valve being spaced from the peripheral shoulder of the inner valve, upon alignment of the seat engaging faces of said valves.

2. In a construction of the class described: a valve cage adapted for mounting in vertical position; a valve seat mounted on the lower end of said cage and having a central opening formed therethrough for passage of liquid therethrough and provided on its upper end with a valve engaging face; a plurality of concentrically arranged cup-shaped valves arranged in nesting relation and simultaneously engaging at the end faces of their open ends with said valve engaging face and independently movable relatively to said valve seat, each of said valves being reduced in internal diameter inwardly from the open end thereof to provide an internal and a peripheral shoulder, the depth of the reduced portion of the valve in which another valve is nested being greater than the length of the reduced portion of the nested valve to provide a space between the inner face of the base of one valve and the outer face of the base of the nested valve upon engagement of the opposed shoulders on said valve, said valves nesting with clearance between the same for permitting entry of liquid thereinto.

CHALON E. BRIDWELL.

REFERENCES CITED

The following references are of record in the file of this patent:

UNITED STATES PATENTS

| Number | Name | Date |
| --- | --- | --- |
| 349,586 | Glace | Sept. 21, 1886 |
| 741,217 | Betts | Oct. 13, 1903 |
| 1,199,569 | Kelsey | Sept. 26, 1916 |
| 1,200,268 | Taggert | Oct. 3, 1916 |
| 1,710,054 | Grant | Apr. 23, 1929 |
| 1,710,635 | Wertz | Apr. 23, 1929 |